United States Patent Office 3,250,626
Patented May 10, 1966

3,250,626
COOKED, CHEMICALLY-LEAVENED FOOD LAMINATES
Ray J. Thelen, 6501 5th Ave. S., Minneapolis, Minn.
No Drawing. Filed Aug. 26, 1963, Ser. No. 304,668
4 Claims. (Cl. 99—86)

The invention relates to new and very useful flour-based, completely chemically-leavened, cooked and intermediate foodstuffs prepared by laminating a chemically-leavened dough layer to a chemically-leavened, flavored paste layer. The cooked products have a characteristic continuously-cellulated, self-supporting structure.

This invention also relates to methods for making such food products.

As those skilled in the art will appreciate, recently some segments of the baking and milling industry have developed techniques and products involving the use of chemical leavening agents in place of yeast as a leavening agent in order to produce products which have properties similar to conventional baked products which are yeast leavened. The texture, appearance, taste, etc., of these new chemically-leavened products are substantially indistinguishable by the consumer from the conventional yeast-leavened products. One of the big advantages of these new chemically-leavened products is that the dough can be frozen or refrigerated and merchandised as frozen or retarded refrigerated food products which the housewife can bake directly without having to go through an intermediate thawing and proofing period (i.e., a period in which the yeast is allowed to expand the dough volumetrically before baking or the like).

One of the big problems in the preparation of the new chemically-leavened food products is that in chemically-leavened doughs, it is difficult to realize desired product, volume, grain and texture when high percentages of flavoring material are incorporated in them. I have now discovered that it is possible to produce chemically-leavened foodstuffs which have a high flavoring content and which have continuously cellulated structures when cooked. These structures are produced by laminating a chemically-leavened dough having a relatively small total flavoring content to a chemically-leavened paste having a relatively large flavoring content. The chemically-leavened dough acts as a structure or self-supporting member for the flavoring carrying paste.

An object of this invention is to provide intermediate or uncooked flour-based, chemically-leavened foods wherein a dough layer is laminated to a paste layer.

Another object of this invention is to provide cooked, flour-based, flavored, chemically-leavened foods having continuously cellulated, self-supporting structures and wherein a chemically-leavened dough layer is directly and continuously associated on at least one surface with a chemically-leavened paste layer.

Another object of this invention is to provide methods for making flour-based, chemically-leavened foods from laminated alternate layers of chemically-leavened dough and chemically-leavened paste and which foods have, when cooked, a characteristic continuously cellulated, self-supporting structure.

Additional objects of this invention will become apparent to those skilled in the art from the following detailed description.

In practicing my invention one can employ any chemically-leavened dough. The chemical composition of a chemically-leavened dough can vary widely, depending upon a number of variables such as whether the product is to be lean or rich in calorie content, type of product being prepared, type of ingredients to be used in combination with flour and chemical leavening agent, etc. There are a number of types of chemically-leavened doughs; therefore it is not practicable to give a single or simple formulation that will accurately cover all chemically-leavened dough types.

Thus, the chemically-leavened dough type used can range from a very lean bread-type dough to the very richest of pastry-type doughs to which flavorings and/or spices are added as required to suit consumer taste.

As those skilled in the art know, chemically-leavened doughs, regardless of type used, may include fruits, meats, seafoods, dairy products, spices, vegetables, nuts, seeds, etc. Thus, as examples, one can cite raisin bread which can include up to 50 percent as much raisins as dough, cheese bread which may include up to 25 percent or more of cheese than dough, orange-nut bread which may include up to 20 parts by weight or more of ground oranges and chopped nutmeats.

In general, however, the term "chemically-leavened dough" as used herein refers to a soft mass of moistened flour containing chemical-leavening materials such as sodium bicarbonate, Glucona Delt Lactone and/or acidulants which have been mixed in the customary ways and has a physical consistency suitable for sheeting and which when baked or otherwise cooked expands into a cellular or cellulated, self-supporting structure. Chemically-leavened doughs characteriscally have total flour contents falling in the range from about 50 to 75 percent of the total chemically-leavened dough mass, especially as used in this invention.

Also, in practicing my invention, I can employ as the chemically-leavened paste any nonyeast-leavened cake batter, cookie dough, or the like. As in the case of chemically-leavened doughs, chemically-leavened pastes can be prepared in any one of a variety of ways, as demonstrated by the instruction of virtually any reference book on cooking. Generally speaking, such pastes contain flour, shortening (which is bland and does not contribute by itself to product flavoring), structure building materials (commonly derived from or consisting of eggs), flavoring, and water. Owing to the variety of possible formulations, it is not meaningful to give one generalized formulation accurately embracing all chemically-leavened dough types.

However, it will be understood that the term "chemically-leavened" or equivalent as used herein refers to a combination of sodium bicarbonate with acidifiers such as tartrates, phosphates, and the like and which acts by giving off carbon dioxide gas during baking.

Similarly, the term "flavoring" or equivalent as used herein has reference to any one or more of the solid, semi-solid, or liquid materials of natural or synthetic origin which are used to impart flavor to cooked foods and includes such various items as salt, sugar, nuts, fruits, plant extracts, and the like, as those skilled in the art appreciate.

Thus, the term "chemically-leavened paste" as used herein has reference to a chemically-leavened mixture of flour, water, flavoring, and other ingredients, which mixture has a viscosity ranging from a thin, pourable consistency to a thick, putty-like consistency and which when baked or otherwise cooked expands into a cellular or cellulated, self-supporting structure. Chemically-leavened pastes characteristically have total flour contents falling in the range from about 10 to 25 weight percent, especially as used in this invention. Preferably, chemically-leavened pastes used in this invention almost always have a flavoring content usually about 10 weight percent of the total paste weight. When potent flavorings like cinnamon, anise, almond extract, etc., are used, the percentage is less.

Largely because of the fact that chemically-leavened pastes usually always have characteristically lower total flour contents than the total flour content of chemically-leavened doughs, plus the fact that chemically-leavened or air-leavened pastes usually always contain eggs which are known to be excellent structure building materials, one can incorporate generally higher quantities of flavoring in chemically-leavened pastes, compared to chemically-leavened doughs. In making the products of my invention, I like to take advantage of this fact and so prefer to introduce larger quantities of flavoring into the chemically-leavened pastes than into the chemically-leavened doughs.

It is easy and practicable to use a chemically-leavened paste formulation where the weight percentage of flour ranges from about 10 to 25 percent, and the weight percentage of flavoring is almost always usually at least about 10 percent. When potent flavors such as cinnamon, nutmeg, allspice, etc., are used, the percentage of flavoring used is less as required to realize the desired flavor characteristics. In such formulation I maintain the total water content in a chemically-leavened paste below 35 weight percent, the balance up to 100 weight percent comprises shortening, salt, eggs, non-fat dry milk, etc.

Following preparation of the chemically-leavened and of the chemically-leavened paste, intermediate or uncooked products of the invention can be made.

First, the chemically-leavened dough is sheeted by any convenient procedure. Commercially, for example, the dough would be sheeted onto a moving conveyor belt by any readily available dough processing equipment such as Anetsberger, Moline, or Stickleber. I prefer to form dough sheets having thicknesses of from about $\frac{1}{16}$ to $\frac{3}{8}$ inch.

Next, chemically-leavened paste is applied to the top or exposed face of the dough sheet using any convenient procedure such as spatula application. Commercially this can be done, for example, by pumping the chemically-leavened paste upon the sheeted dough moving on a conveyor belt in the form of longitudinally extending, spaced parallel ribbons of chemically-leavened paste, as from an Alemite pump or the like. Thereafter, a stationary spreader can be used to flatten the ribbons upon the chemically-leavened dough to produce a continuous layer of chemically-leavened paste over the top face of the dough sheet. I prefer to use chemically-leavened paste thicknesses in the range from about $\frac{1}{16}$ to $\frac{3}{8}$ inch. While no special precautions, procedure, or the like need be observe in forming the laminations of chemically-leavened paste and chemically-leavened sheeted dough, naturally the chemically-leavened paste should be uniformly spread upon the desired area of the sheeted dough so as to avoid any entrainment of air bubbles between the chemically-leavened paste layer and the chemically-leavened dough layer or sheet.

The next stop after formation of the laminate of chemically-leavened paste and chemically-leavened sheeted dough is to curl or roll the laminate if the food product being manufactured is to be in a roll form.

However, rolling is not at all necessary to make products within my invention, since I have found it possible using my invention to make many delicious food products which are in a generally flat or folded form and consist of alternating layers of chemically-leavened paste and chemically-leavened sheeted dough arranged in sandwich or stack fashion. One excellent type of flat product utilizes a bottom layer and a top layer each of chemically-leavened sheeted dough and a middle or intermediate layer of chemically-leavened paste. To make such a product, one can simply sheet out a layer of chemically-leavened dough, spread a layer of chemically-leavened paste over the lower half of the dough sheet and fold the top half over it, thus forming a sandwich on the moving conveyor belt as in the illustration given above.

When a two-layer laminate of chemically-leavened paste and chemically-leavened sheeted dough is curled, however, such curling is conveniently accomplished by using a conventional curler which results in the formation of a string of coiled laminate which extends longitudinally of the conveyor belt. The string is preferably rather tightly wound so as to achieve uniform contact between adjoining faces of layers therein.

The curled dough string and the flat sandwich-like structures are each further processed in any way desired, or formed into any shape desired by suitable cutting and/or shaping operations. The resulting intermediate or uncooked products are very useful in commerce, for they can be stored, as by refrigeration or freezing, for subsequent use. When suitably packaged, these intermediate products are attractive consumer products in the frozen and/or refrigerated food field.

Although the intermediate products are usually cooked by baking, any conventional cooking procedure can be used. Since the chemically-leavened dough and the chemically-leavened paste are each of generally conventional composition, and since the cooking of such materials is familiar to those skilled in the art, no detailed description of same is given herein.

The invention will be further illustrated by reference to the following examples:

A. EXEMPLARY TYPES OF CHEMICALLY-LEAVENED DOUGHS

1. Biscuit dough

| | Lbs. | Oz. |
|---|---|---|
| Bread and/or pastry flour | 6 | 14 |
| Shortening | 1 | 12 |
| Sugar | | 1½ |
| Salt | | 2½ |
| Sodium bicarbonate | | 3½ |
| Glucona Delta Lactone or other chemical leavening system as required to satisfactorily leaven the dough | | 3 |
| Liquid buttermilk | 4 | 6 |

All of the ingredients except the buttermilk are blended as for making pie dough. When the shortening particles have been reduced to pea or walnut size, the liquid buttermilk is added and mixed only enough to be thoroughly incorporated. The dough is now ready to be sheeted and then laminated with the chemically-leavened paste.

2. Bread dough

| | Lbs. | Oz. |
|---|---|---|
| Bread flour | 9 | |
| Sugar | | 10 |
| Non-fat dry milk | | 7½ |
| Salt | | 1½ |
| Soda | | 5 |
| Shortening | | 8 |
| Glucona Delta Lactone or other chemical leavening system as required to satisfactorily leaven the dough | | 11 |
| Water | 5 | |

All of the ingredients are blended together until a smooth dough of medium consistency results. The dough is now ready to be sheeted and then laminated with the chemically-leaven paste.

3. Sweet roll and/or coffee cake dough

| | Lbs. | Oz. |
|---|---|---|
| Bread and pastry flour | 12 | 3 |
| Shortening | 1 | 9 |
| Salt | | 3 |
| Sugar | 1 | 9 |
| Non-fat dry milk | | 8 |
| Glucona Delta Lactone or other chemical leavening system as required to satisfactorily leaven the dough | | 11 |
| Soda | | 5½ |
| Whole eggs | 1 | 4 |
| Water | 6 | 2 |

All of the ingredients are blended together until a smooth dough of medium consistency results. The dough is now ready to be sheeted and then laminated with the chemically-leavened paste.

4. Danish pastry

|  | Lbs. | Oz. |
| --- | --- | --- |
| Bread flour | 12 | 8 |
| Sodium bicarbonate |  | 4½ |
| Glucona Delta Lactone or other chemical leavening system as required to satisfactorily leaven the dough |  |  |
| Water |  | 8 |
| Corn Sugar | 4 | 1 |
| Granulated sugar | 1 | 2 |
| Shortening | 1 | 2 |
| Salt | 1 | 9 |
| Whole eggs |  | 1½ |
| Non-fat dry milk | 2 | 2 |
| Roll-in shortening |  | 8 |
|  | 8 | 2 |

The water, corn sugar, granulated sugar, shortening, salt, eggs, and non-fat dry milk are thoroughly blended together. The flour, sodium bicarbonate, and Glucona Delta Lactone or other suitable leavening ingredients are sifted together and then added to the first mixture and mixed until the dough is smooth. The dough is then allowed to rest in a cool place such as a dough retarder for 20 to 30 minutes. Next, the dough is rolled out on a flat surface and spread with roll-in shortening. It is then given three folds and again allowed to rest in a cool place such as a dough retarder for 20 to 30 minutes. This rolling and folding operation is repeated twice more, allowing the dough to rest for 20 to 30 minutes between rollings. After the last rest the dough is ready to be sheeted for lamination with a chemically-leavened paste.

B. EXEMPLARY TYPES OF CHEMICALLY-LEAVENED PASTES

1. Coffee cake paste

|  | Lbs. | Oz. |
| --- | --- | --- |
| Granulated sugar | 6 |  |
| Shortening | 1 | 6 |
| Butter | 1 | 6 |
| Honey |  | 8 |
| Salt |  | 1 |
| Soda |  | ½ |
| Whole eggs | 2 | 14 |
| Liquid milk | 3 |  |
| Cake flour | 7 | 8 |
| Baking powder |  | ½ |
| Vanilla flavoring |  | 1 |
| Cinnamon | 1 |  |

The sugar, shortening, butter, honey, salt, cinnamon, and soda are blended together until they are smooth. Next, the eggs are added in three or four portions, incorporating thoroughly after each addition. Next, the milk is added alternately with the cake flour and is mixed until a smooth drop cookie consistency is obtained. If necessary, the paste can be thinned down to proper spreading consistency with eggs or egg whites. The paste is now ready to be laminated on a chemically-leavened dough.

2. Chocolate paste

|  | Lbs. | Oz. |
| --- | --- | --- |
| Granulated sugar | 6 |  |
| Cocoa (light Dutch) | 1 |  |
| Shortening | 1 | 6 |
| Butter | 1 | 6 |
| Honey |  | 8 |
| Soda |  | ½ |
| Salt |  | ½ |
| Vanilla flavoring |  | 1 |
| Whole eggs | 2 | 14 |
| Liquid milk | 3 |  |
| Cake flour | 7 | 8 |
| Baking powder |  | ½ |

The sugar, cocoa, shortening, butter, honey, soda, salt, and vanilla are thoroughly creamed together. Then the eggs are added in three or four portions and mixed thoroughly after each addition. Next, the milk is added alternately with the cake flour and baking powder and mixed well after each addition until a smooth drop cookie consistency is obtained. If necessary, the paste can be thinned down to proper spreading consistency with eggs or egg whites. The paste is now ready for lamination with a chemically-leavened dough.

3. White paste

|  | Lbs. | Oz. |
| --- | --- | --- |
| Cake flour | 6 |  |
| Emulsified shortening | 2 | 2 |
| Salt |  | 3 |
| Skim milk solids |  | 12 |
| Egg whites | 4 |  |
| Water | 1 |  |
| Baking powder |  | 4 |
| Sugar | 5 |  |
| Vanilla flavoring |  | 1 |

The sugar, shortening, salt, milk solids, and vanilla are creamed together thoroughly. Next, the water is added alternately with the cake flour and baking powder and mixed well. Next, the egg whites are whipped until stiff but not dry and then folded into the above mixture to form a paste of proper spreading consistency. The paste is now ready to be laminated on a chemically-leavened dough.

4. Cheese paste

|  | Lbs. | Oz. |
| --- | --- | --- |
| Sugar | 5 |  |
| Shortening | 1 | 8 |
| Cream cheese | 1 | 8 |
| Dehydrated cheddar |  | 8 |
| Salt |  | 3 |
| Nonfat dry milk |  | 8 |
| Whole eggs | 2 | 8 |
| Cake flour | 5 | 12 |
| Baking powder |  | 2 |
| Water (variable to obtain spreadable consistancy) | 2 |  |

All of the dry materials, shortening, cheese and water are blended together until a smooth paste is formed. The eggs are added in three or four portions incorporating thoroughly after each addition. The paste is now ready for lamination with a chemically-leavened dough.

LAMINATES OF THE INVENTION

Example 1

To make a laminate using the chemically-leavened biscuit dough formulation A1 above and the chemically-leavened cheese paste B4 above, one sheets the biscuit dough to a thickness of about ⅜ inch and spreads thereover a layer of cheese paste approximately ¼ inch thick on top of which is deposited another layer of sheeted biscuit dough of about ⅜ inch thickness. From the resulting laminated flat structure are cut rounds of biscuit sandwiches approximately 2 inches across in diameter. The resulting biscuits can either be frozen or retarded for storage as an intermediate food product of the invention, or baked. Here the biscuit sandwiches are baked in an oven for 5 to 8 minutes at 450° F. The baked products have continuously cellulated, self-supporting structures, no separation at interfaces between layers being observed therein. The results are summarized in Table I below.

Example 2

The chemically-leavened dough A2 and the chemically-leavened paste B3 above are laminated together by following the general procedure given in Example 1. This laminate is rolled into a single string form having a diameter of approximately three inches in diameter. The string is then cut into loaves approximately 6 inches in length. The resultant units can either be stored in a cool plate (30° to 40° F.) for a period up to ten days as an intermediate food product, frozen for storage up to six months and longer as an intermediate food product, or baked. Here, the units are baked in an oven for 20 to 25 minutes at 400° F. to 425° F. The baked products have continuously cellulated, self-supporting structures, no separation at interfaces between layers being observed therein. The results are summarized in Table I below.

self-supporting structures, no separation at interfaces between layers being observed therein. The results are summarized in Table I below.

TABLE I

| Ex. No. | Intermediate Laminate (Uncooked) | | | | | Product Laminate (End Product Description) | | | |
|---|---|---|---|---|---|---|---|---|---|
| | Chemically-Leavened Dough | | Chemically-Leavened Paste | | | Cooking Process | | | |
| | Type | Layer Thickness | Type | Layer Thickness | Shape | Method | Temp., °F. | Time | Comments |
| 1 | A1 | 3/8" | B4 | 1/4" | Biscuit Sandwich 2 layers of chem. leav. dough one chem. leav. paste. | Baked Retarded Frozen | 450 34-40 −20−−40 | [1] 5-8 [2] 7-10 [3] | Offers completely new biscuit variety for restaurants, institutions, etc. Flavors such as tuna fish, shrimp, bacon, etc., can easily be introduced. |
| 2 | A2 | 3/8" | B3 | 1/4" | 3" diameter loaf | Baked Retarded Frozen | 400-425 34-40 −20−−40 | [1] 20-25 [2] 7-10 [3] | Can have baked bread less than an hour after removing from freezer. |
| 3 | A3 | 1/4" to 3/8" | B1 | 1/4" | Slices 2" diameter, 3/4"-1" thick and panned. | Baked Retarded Frozen | 385-400 34-40 −20−−40 | [1] 20-25 [2] 7-10 [3] | Same as above. |
| 4 | A4 | 1/4" to 3/8" | B2 | 1/4" to 3/8" | Cupcake | Baked Retarded Frozen | 375-400 34-40 −20−−40 | [1] 12-15 [2] 7-10 [3] | Combinateion cake and pastry heretofore never offered to the consuming public. |

[1] Minutes.  [2] Days.  [3] 6 months or longer

*Example 3*

The chemically-leavened dough A3 and the chemically-leavened paste B1 above are laminated together by following the general procedure given in Example 1. The dough is sheeted to a thickness of 1/4 inch and spread with a layer of paste 1/4 inch thick. This laminate is rolled into a single string form having a diameter of approximately two inches. The string is next cut into slices approximately one inch thick. These slices are then placed in baking pans or containers to be frozen as an intermediate food product of the invention, stored in a cool place (34° to 40° F.) for a period up to ten days or longer, or baked. Here the panned slices are baked in an oven for 20 to 25 minutes at 385° to 400° F. The baked products have continuously cellulated, self-supporting structure, no separation at interfaces between layers being observed therein. The results are summarized in Table I below.

*Example 4*

To make a laminate using the chemically-leavened Danish pastry dough formulation A4 above and the chemically-leavened chocolate paste B2 above, one sheets the pastry dough to a thickness of 1/4 inch and a width of 8 inches and spreads thereover an equal layer of chocolate paste. This laminate is then rolled into a string having a diameter of about 1 1/4 inches. Next, the string is cut into slices weighing approximately 1 1/4 ounces, and these slices are placed in paper lined or oiled standard muffin or cupcake tins. The resultant units can either be stored in a cool place (34° to 40° F.) for a period up to ten days or longer, frozen for storage as an intermediate food product of the invention for a period up to six months or longer, or baked. Here, the units are baked in an oven for 12 to 15 minutes at 380° to 400° F. When the baked product is cool, it is finished by decorating top sides with white or chocolate fudge icing. The baked products have continuously cellulated, While I have shown and described specific and preferred embodiments above I wish it to be specifically understood that the same are capable of modification without departure from the spirit and scope of the appended claims.

The claims are:

1. A cooked flour-based food product comprising a continuously cellulated self-supporting structure characterized by:
   (a) a chemically-leavened dough sheet bonded on at least one surface to a layer of chemically-leavened, flavored paste,
   (b) said chemically-leavened dough sheet having a total flour content in the range of about 40 to 60 percent, based on total weight of chemically-leavened dough, and
   (c) said chemically-leavened, flavored paste layer by having a total flour content in the range of from about 10 to 25 weight percent, based on total weight of chemically-leavened paste, and by having a total flavoring content at least about 10 percent.

2. The product of claim 1 wherein said chemically-leavened paste layer is further characterized by having a water content not greater than about 35 weight percent based on total weight of chemically-leavened dough.

3. The product of claim 1 wherein said chemically-leavened flavored paste layer contains a total flavoring content less than about 10 weight percent and such flavoring is a potent flavor.

4. A cooked flour-based, flavored, chemically-leavened, laminated food product comprising a continuously cellulated, self-supporting structure, said structure being characterized by having at least one layer of a chemically-leavened, flavored paste bonded on at least one surface to a layer of a chemically-leavened dough sheet.

(References on following page)

References Cited by the Examiner

UNITED STATES PATENTS

| | | | |
|---|---|---|---|
| 1,946,495 | 2/1934 | Jones | 99—86 |
| 1,975,326 | 10/1934 | Loose et al. | 107—54 |
| 2,060,490 | 11/1936 | Borbely | 99—86 |
| 2,547,206 | 3/1951 | Hanau | 99—92 |
| 2,598,282 | 5/1952 | Melnick | 99—139 |
| 2,627,825 | 2/1953 | Stiles | 107—54 |
| 3,142,573 | 7/1964 | Erekson et al. | 99—90 |

OTHER REFERENCES

Daniel, A. R.: "Bakery Materials and Methods," London, Maclaren and Sons, Ltd., 1963, 4th Edition, pp. 398–399.

"Betty Crocker's Picture Cook Book," 1st Edition, 1950, McGraw-Hill Book Company, Inc. New York, page 122.

A. LOUIS MONACELL, *Primary Examiner.*

RAYMOND N. JONES, *Examiner.*